US010042121B1

(12) United States Patent
Haller

(10) Patent No.: US 10,042,121 B1
(45) Date of Patent: Aug. 7, 2018

(54) TOROIDAL MICRO LENS ARRAY FOR USE IN A WAVELENGTH SELECTIVE SWITCH

(71) Applicant: Nistica, Inc., Bridgewater, NJ (US)

(72) Inventor: Mitchell E. Haller, Marlboro, NJ (US)

(73) Assignee: Nistica, Inc., Bridgewater, NJ (US)

(*) Notice: Subject to any disclaimer, the term of this patent is extended or adjusted under 35 U.S.C. 154(b) by 0 days.

(21) Appl. No.: 15/471,560

(22) Filed: Mar. 28, 2017

(51) Int. Cl.
*G02B 6/42* (2006.01)
*G02B 6/35* (2006.01)
*G02B 6/293* (2006.01)
*G02B 6/32* (2006.01)
*G02B 3/04* (2006.01)
*G02F 1/29* (2006.01)
*G02B 6/26* (2006.01)
*G02F 1/31* (2006.01)

(52) U.S. Cl.
CPC .......... *G02B 6/3512* (2013.01); *G02B 3/04* (2013.01); *G02B 6/29373* (2013.01); *G02B 6/32* (2013.01); *G02B 6/356* (2013.01); *G02F 1/29* (2013.01); *G02F 1/31* (2013.01)

(58) Field of Classification Search
CPC .................................................. G02B 6/3512
See application file for complete search history.

(56) References Cited

U.S. PATENT DOCUMENTS

| 6,408,115 | B1 | 6/2002 | McIntyre | |
|---|---|---|---|---|
| 7,187,399 | B2 * | 3/2007 | Noguchi | .................. B41J 2/465 347/241 |
| 9,380,360 | B2 * | 6/2016 | You | ..................... H04Q 11/0005 |
| 9,521,473 | B2 * | 12/2016 | Wagener | ............ H04Q 11/0005 |
| 9,632,391 | B2 * | 4/2017 | Wagener | ................... G02F 1/31 |
| 9,661,406 | B2 * | 5/2017 | Wagener | ............ H04Q 11/0005 |
| 2002/0064191 | A1 | 5/2002 | Capewell | |
| 2007/0127326 | A1 * | 6/2007 | Nakajima | ............ G02B 3/0018 369/44.15 |
| 2008/0008415 | A1 | 1/2008 | Davis et al. | |
| 2014/0285867 | A1 * | 9/2014 | Wagener | ................... G02F 1/31 359/279 |
| 2016/0259128 | A1 | 9/2016 | Wagener et al. | |

FOREIGN PATENT DOCUMENTS

DE          80005018 T2     6/2004

* cited by examiner

*Primary Examiner* — Rhonda Peace
(74) *Attorney, Agent, or Firm* — Stuart H. Mayer; Mayer & Williams PC

(57) ABSTRACT

An optical device includes a plurality of optical ports for receiving optical beams. The optical device also includes a plurality of toric micro lenses each receiving one of the optical beams from a respective one of the optical ports. A dispersion element is provided for spatially separating in a dispersion plane the optical beam into a plurality of wavelength components. At least one focusing element is provided for focusing the plurality of wavelength components. A programmable optical phase modulator is also provided for receiving the focused plurality of wavelength components. The modulator is configured to selectively direct the wavelength components to prescribed ones of the optical ports. The toric lenses impart positive power to the optical beams in the port plane and negative optical power to the optical beams in a plane orthogonal to the port plane.

9 Claims, 6 Drawing Sheets

TOROIDAL MICRO LENS ARRAY FOR USE IN A WAVELENGTH SELECTIVE SWITCH

BACKGROUND

Free space fiber optic telecommunications devices often require launch optics with different beam waist sizes in orthogonal directions. For example, consider a wavelength selective switch (WSS), which allows certain wavelength components or channels of WDM optical signal to be spatially separated (dispersed) and selectively switched from a first optical fiber to a second optical fiber while letting the other wavelength channels propagate in the first optical fiber, or it allows certain wavelength channels to be switched to a third optical fiber. The resolution (or band edge sharpness) of the switch is determined by the beam waist size in the direction along which the wavelength components are dispersed at the switch focal plane (referred to herein as the dispersion beam waist size), which is equal to the launch optic beam waist size in the dispersion plane times the system magnification. In order to achieve the best resolution (sharpest band edges) the launch optic should produce a small beam waist in the dispersion plane.

On the other hand, the beam waist size in the direction orthogonal to the dispersion direction (the port direction) at the switch focal plane (referred to herein as the port beam waist size) limits the number of ports that the switch can support. A large beam waist has a small angular extent, which allows many ports to be located in a given angular switching range without crosstalk. The port beam waist at the switch focal plane is equal to the beam waist in the port direction of the launch optic times the system magnification. So in order to provide a high port density or total port count, it is desirable that the launch optic produce a large port beam waist.

SUMMARY

In accordance with one aspect of the disclosed subject matter, an optical device is provided. The optical device includes a plurality of optical ports for receiving optical beams. The optical device also includes a plurality of toric micro lenses each receiving one of the optical beams from a respective one of the optical ports. A dispersion element is provided for spatially separating in a dispersion plane the optical beam into a plurality of wavelength components. At least one focusing element is provided for focusing the plurality of wavelength components. A programmable optical phase modulator is also provided for receiving the focused plurality of wavelength components. The modulator is configured to selectively direct the wavelength components to prescribed ones of the optical ports. The toric lenses impart positive power to the optical beams in the port plane and negative optical power to the optical beams in a plane orthogonal to the port plane.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. These and various other features will be apparent from a reading of the following Detailed Description and a review of the associated drawings.

DETAILED DESCRIPTION

Figure 1A:
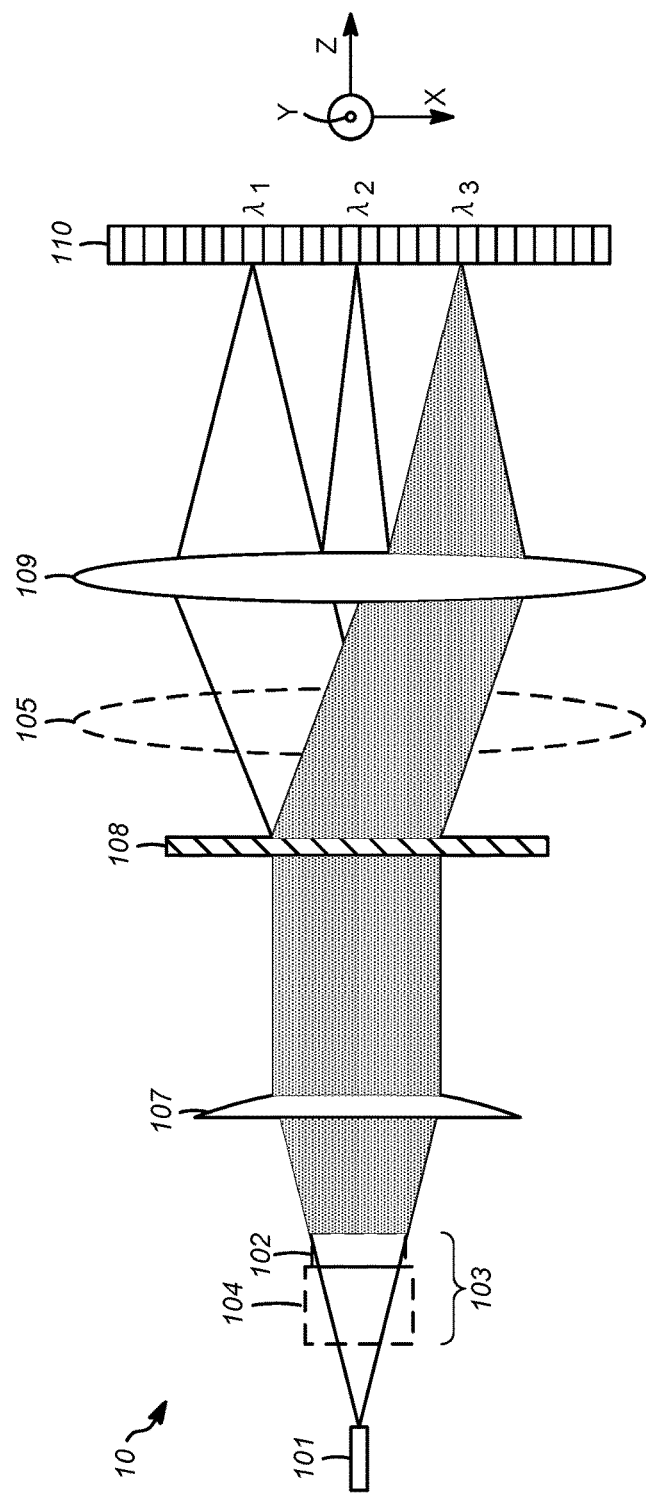
FIGS. 1A and 1B are top and side views respectively of one example of a simplified optical device such as a free-space WSS.
Figure 1B:
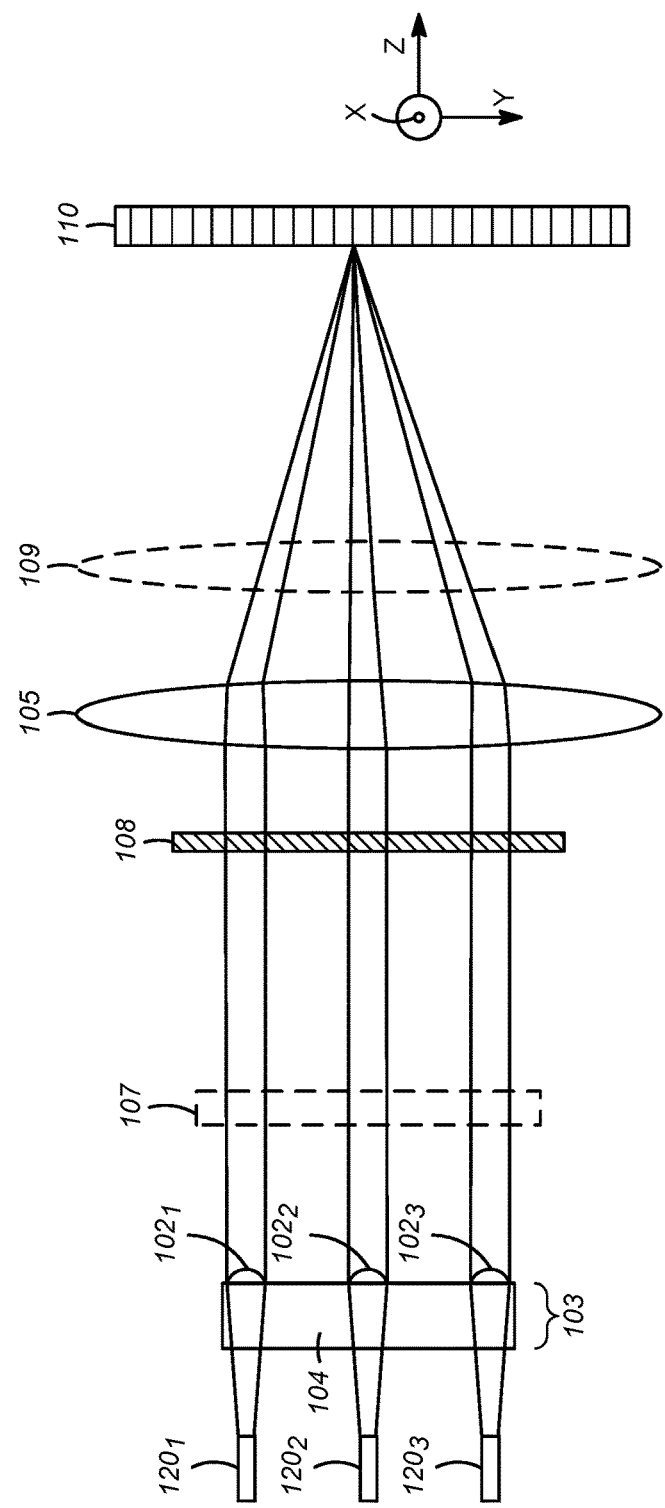

FIGS. 1A and 1B are top and side views respectively of one example of a simplified optical device such as a free-space WSS 10 that may be used in conjunction with embodiments of the present invention. The top view of FIG. 1A illustrates the dispersion plane of the WSS 10 and the side view of FIG. 1B illustrates the port plane of the WSS 10. Light is input and output to the WSS 10 through an array 101 of optical waveguides such as optical fibers which serve as input and output ports. As best seen in FIG. 1B, the array 101 includes a plurality of individual fibers $120_1$, $120_2$ and $120_3$ that receive optical beams that are respectively coupled to micro lenses $102_1$, $102_2$ and $102_3$ ("102") that are supported on or formed on or in an optical module 104, which together define a micro lens array assembly 103. In this example the light exiting from fibers $120_1$, $120_2$ and $120_3$ is parallel to the z-axis. While only three optical fiber/micro lens pairs are shown in FIG. 1B, more generally any suitable number of optical fiber/micro lens pairs may be employed.

In FIGS. 1A and 1B, optical elements which affect the light in two axes are illustrated with solid lines as bi-convex optics in both views. On the other hand, optical elements which only affect the light in one axis are illustrated with solid lines as plano-convex lenses in the axis that is affected. The optical elements which only affect light in one axis are also illustrated by dashed lines in the axis which they do not affect. For instance, in FIGS. 1A and 1B the optical elements 108 and 110 are depicted with solid lines in both figures. On the other hand, optical elements 107 and 109 are depicted with solid lines in FIG. 1A (since they have focusing power along the y-axis) and with dashed lines in FIG. 1B (since they leave the beams unaffected along the x-axis). Optical elements 102 and 105 are depicted with solid lines in FIG. 1B (since they have focusing power along the x-axis) and with dashed lines in FIG. 1A (since they leave the beams unaffected in the y-axis).

The optical module 104 in the micro lens array assembly 103 allows the light to propagate therethrough in an unconfined manner. That is, the optical module 104 does not provide any waveguiding function. In a conventional arrangement, the micro lenses 1021, 1022 and 1023 of the lens array assembly 103 are cylindrical lenses that each impart positive optical power in the port plane and leave the beams unaffected in the dispersion plane. The micro lenses 1021, 1022 and 1023 optically couple the light beams to a collimating lens 107 that collimates the beams in the dispersion plane and leaves them unaffected in the port plane. The light beams are then optically coupled from the collimating lens to a wavelength dispersion element 108 (e.g., a diffraction grating or prism), which separates the free space light beams into their constituent wavelengths or channels. The wavelength dispersion element 108 acts to disperse light in different directions on an x-y plane according to its wavelength. The dispersed wavelength components from the dispersion element 108 are directed to the port lens 105.

The port lens 105 leaves the wavelength components unaffected in the dispersion plane and focuses them in the port plane. A frequency lens 109 receives the wavelength components from the port lens 105. The frequency lens 109 focuses the wavelength components in the dispersion plane and leaves them unaffected in the port plane.

The frequency lens 109 couples the wavelength components so that they are now focused in both planes onto a programmable optical phase modulator, which may be, for example, a liquid crystal-based phase modulator such as a LCoS device 110. The wavelength components are dispersed along the x-axis, which is referred to as the wavelength dispersion direction or axis. Accordingly, each wavelength component of a given wavelength is focused on an array of pixels extending in the y-direction. By way of example, and not by way of limitation, three such wavelength components having center wavelengths denoted $\lambda 1$, $\lambda 2$ and $\lambda 3$ are shown in FIG. 1A being focused on the LCoS device 110 along the wavelength dispersion axis (x-axis).

As best seen in FIG. 1B, after reflection from the LCoS device 110, each wavelength component can be coupled back through the frequency lens 109, port lens 105, dispersion element 108 and lens 107 and micro lens array module 103 to a selected one of the fibers 120 in the fiber array 101.

Figure 2:
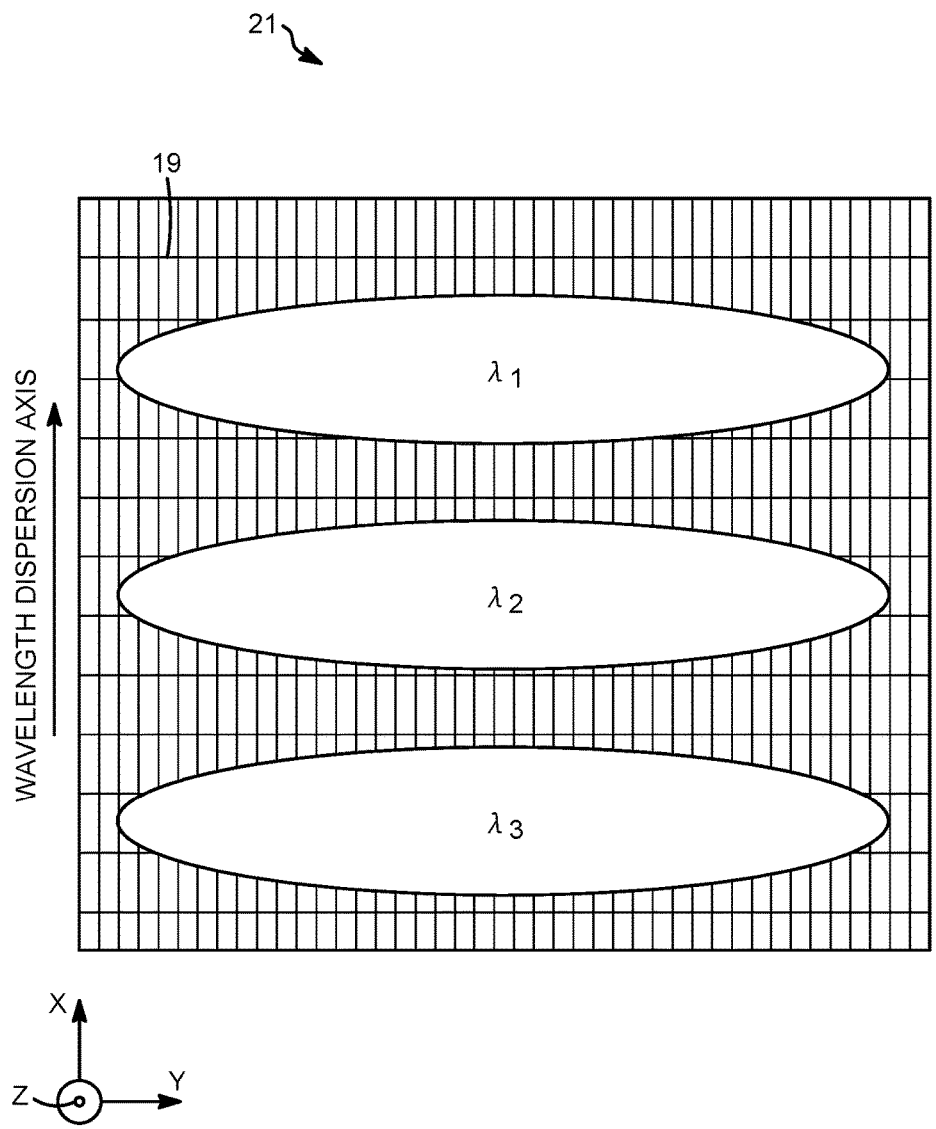
FIG. 2 is a front view of a LCoS device that may be employed as the spatial light modulator for the optical device shown in FIG. 1.

FIG. 2 is a front view of a LCoS device 21 that may be employed as the spatial light modulator for the optical device shown in FIG. 1. In this illustrative example an optical beam having three wavelength components $\lambda 1$, $\lambda 2$ and $\lambda 3$ are spatially separated along the wavelength dispersion axis (x-axis) and extend along multiple pixels 19 of the LCoS device 21. The elongated cross-section shape of the wavelength components on the spatial light modulator is determined by the difference in the beam waist sizes of the optical beam as controlled by the micro lenses 102. It should be noted that while the wavelength components are illustrated as having an oval cross-sectional shape, more generally the wavelength components may have any cross-sectional shape, including, for instance, crescent shapes.

Figure 3A:
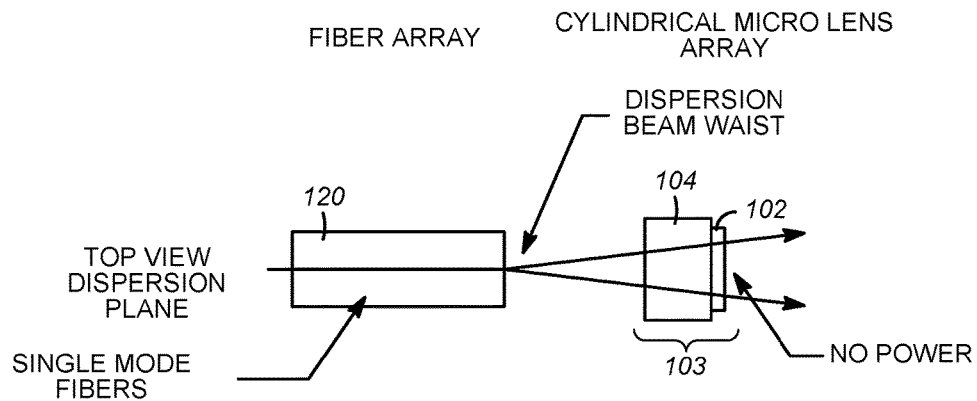
FIGS. 3A and 3B show an expanded top and side view, respectively, of a conventional micro lens array module having cylindrical lenses, which is sometimes employed in the optical device shown in FIGS. 1A and 1B.
Figure 3B:
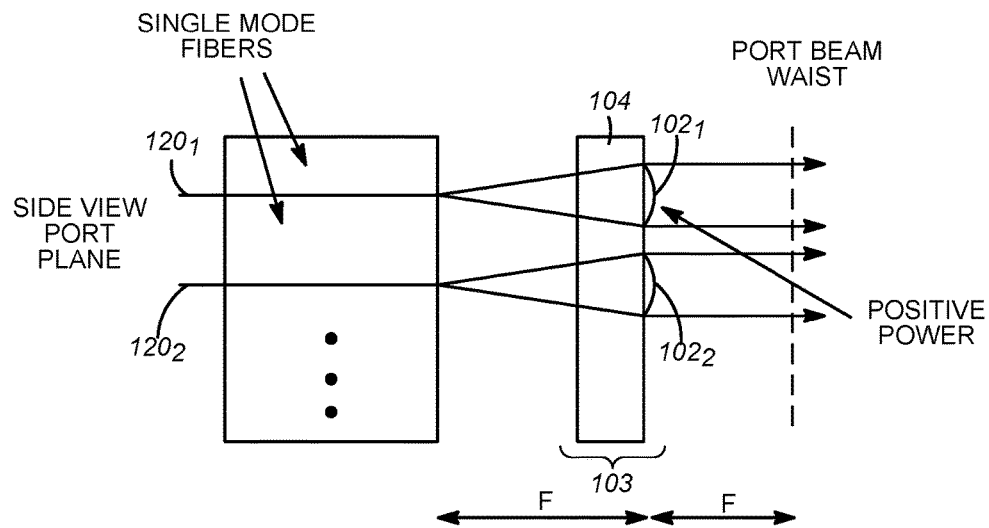

FIGS. 3A and 3B show an expanded top and side view, respectively, of the fibers 120 and a conventional micro lens array module 103 that may be employed in an optical device of the type shown in FIGS. 1A and 1B, for example. As previously mentioned, in order to obtain beam waist sizes that differ in orthogonal directions, the cylindrical micro lenses 102 impart positive optical power in the port plane and leave the beams unaffected in the dispersion plane. If the optical beams are treated as Gaussian beams, then in accordance with Gaussian beam imaging, the beam waist size in the port plane is determined by the fiber beam waist and the focal length of the cylindrical micro lenses. Likewise, if the fibers 120 in the fiber array 101 are positioned at the back focus on the cylindrical micro lenses 102, the beam waist in the port plane will form at the front focus of the cylindrical micro lenses 102. The location of the beam waist can be moved backward or forward from this location by defocusing. The beam waists in the dispersion plane are located at the end of the fibers 120 and their size is determined by the fiber that is employed. By way of example, for standard Corning SMF-28e fiber, the beam waist size in the dispersion plane is 5.2 um at a wavelength of 1550 nm.

As previously mentioned, it is desirable for the port beam waist size of the optical beams received by the fibers 120 in the fiber array 101 to be relatively large in order to achieve a high port count. On the other hand, it is also desirable for the dispersion beam waist size to be relatively small in order to achieve a high resolution. It would be desirable to further reduce the dispersion beam waist size below that which is determined by the type of fiber that is employed in order to further increase the resolution. While the resolution can be improved by increasing the focal length of the collimating lens to thereby reduce the system magnification, this also increases the overall size of the device.

Figure 4A:
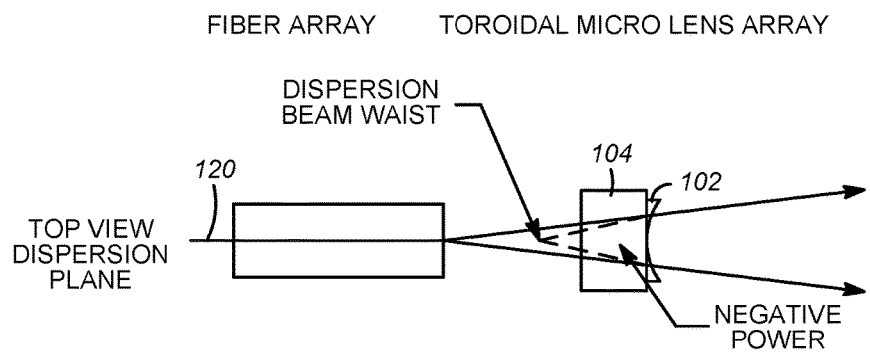
FIGS. 4A and 4B show an expanded top and side view, respectively, of an example of a micro lens array arrangement in accordance with the present invention which employs toroidal lenses.
Figure 4B:
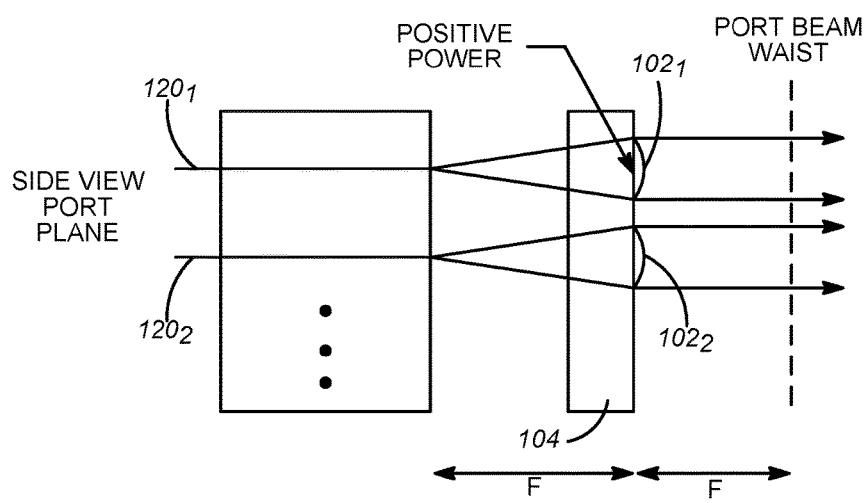

In accordance with one aspect of the present disclosure, the resolution of an optical device such as shown in FIGS. 1A and 1B can be increased by adding negative optical power in the dispersion direction to the micro lenses 102 in the conventional array module 103 shown in FIGS. 3A and 3B. That is, the micro lenses 102 shown in FIGS. 3A and 3B, which are cylindrical lenses, can be replaced with toric lenses that impart negative optical in the dispersion plane and positive optical power in the port plane. Such an arrangement is shown in FIGS. 4A and 4B, which shows an expanded top and side view, respectively, of a fiber array 201 and a micro lens array arrangement 104 similar to that shown in FIGS. 3A and 3B. As seen in FIGS. 4A and 4B, adding negative power to the micro lenses 202 reduces the dispersion beam waist size. This reduction arises because the addition of negative power to the microlenses 202 in the dispersion plane increases the numerical aperture of the optical beams.

Figure 5:
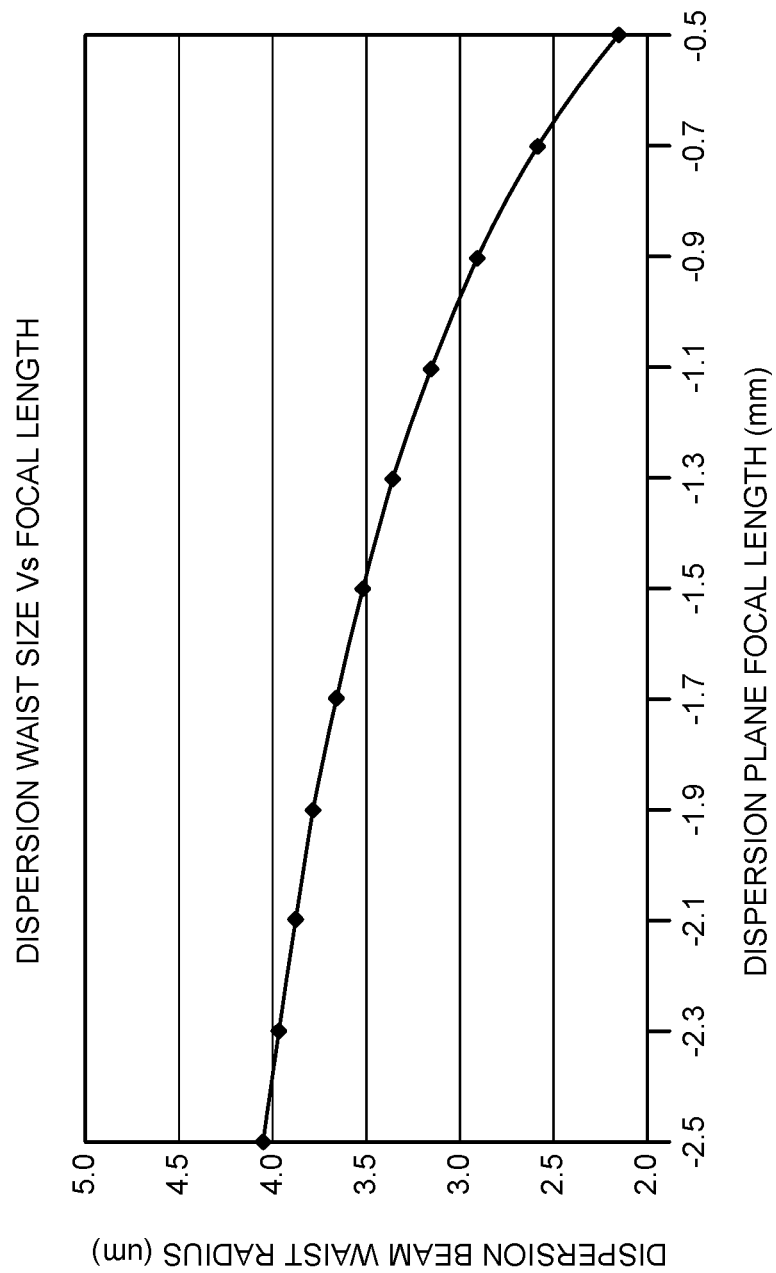
FIG. 5 is a graph showing how the dispersion waist size of the optical beams can be reduced using toric micro lenses for an initial beam size of 5.2 microns.

FIG. 5 is a graph showing how the dispersion waist size of the optical beams can be reduced using toric micro lenses for an initial beam size of 5.2 microns. The graphs show the dispersion waist size as a function of the focal length of the toric micro lenses. As the graph shows, significant reductions in the dispersion waist size, and commensurate increases in resolution, can be achieved using this technique.

In some embodiments the toroidal micro lenses may have aspheric surfaces so that the launch beam quality is nearly ideal in order to avoid an insertion loss penalty. Table 1 shows the M squared (M2) beam quality in the port and dispersion direction for one example of a fiber array/toroidal micro lens array design, which was computed using Zemax™ optical design software. The last row of the Table shows the beam quality that can be achieved using an aspheric toroid. In this case, the M squared beam quality approaches the value 1 (the ideal value for a Gaussian beam) in both the port and dispersion planes.

TABLE 1

| Zemax Model = Micro Lens Toroidal 2b | | | | | | |
|---|---|---|---|---|---|---|
| Defocus (um) | Pitch (um) | Rotation | Conic Constant | M2 Beam Quality- Port | M2 Beam Quality- Dispersion PWP | Beam Size @ (um) |
| 0 | 0 | 0 | 0 | 1.014 | 1.099 | 71.7 |
| 0 | 11.3 | 0 | 0 | 1.018 | 1.099 | 71.7 |
| 15 | 11.3 | 0 | 0 | 1.015 | 1.120 | 62.4 |
| 15 | 11.3 | 0 | −8.5 | 1.014 | 1.003 | 62.4 |

In one embodiment, the toric micro lenses are positioned relative to the optical ports so that the optical beams are defocused, extending the port beam wait to a distance from which the optical beams are respectively received such that a beam waist of the optical beams in the orthogonal direction is moved to a point beyond the focal length of the toric micro lenses.

The invention claimed is:

1. An optical device, comprising:
a plurality of optical ports for receiving optical beams;
a plurality of toric micro lenses each receiving one of the optical beams from a respective one of the optical ports,
a dispersion element for spatially separating in a dispersion plane the optical beam into a plurality of wavelength components;
at least one focusing element for focusing the plurality of wavelength components; and
a programmable optical phase modulator for receiving the focused plurality of wavelength components, the modulator being configured to selectively direct the wavelength components to prescribed ones of the optical ports, wherein the toric lenses impart positive power to the optical beams in the port plane and negative optical power to the optical beams in a plane orthogonal to the port plane.

2. The optical device of claim 1, wherein the toric lenses are aspheric toric lenses.

3. The optical device of claim 1, wherein the toric micro lenses are positioned relative to the optical ports from which the optical beams are respectively received such that a beam waist of the optical beams in the orthogonal direction is projected beyond a focal length of the toric micro lenses.

4. The optical device of claim 1, wherein each of the optical ports includes an optical fiber.

5. The optical device of claim 1, wherein the programmable optical phase modulator includes a liquid crystal-based phase modulator.

6. The optical device of claim 5, wherein the liquid crystal-based phase modulator is a LCoS device.

7. The optical device of claim 1, wherein the dispersive element is selected from the group consisting of a diffraction grating and a prism.

8. An optical launch arrangement comprising:
an array of optical fibers; and
an array of micro lenses, each of the micro lenses being in registration with one of the optical fibers to receive an optical beam directly from the respective optical fiber with which it is in registration without any intervening optical elements, each micro lens being a toric lens that causes an optical beam passing therethough to have a beam waist in one plane that is different in size from a beam waist in an orthogonal plane.

9. The optical launch arrangement of claim 8, wherein the toric lenses are aspheric toric lenses.

* * * * *